(12) United States Patent
Franke

(10) Patent No.: US 11,433,805 B2
(45) Date of Patent: Sep. 6, 2022

(54) LIGHTING UNIT FOR A MOTOR VEHICLE

(71) Applicant: Volkswagen Aktiengesellschaft, Wolfsburg (DE)

(72) Inventor: Stefan Franke, Meinersen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/474,627

(22) Filed: Sep. 14, 2021

(65) Prior Publication Data

US 2022/0017011 A1 Jan. 20, 2022

Related U.S. Application Data

(63) Continuation of application No. PCT/EP2020/055685, filed on Mar. 4, 2020.

(30) Foreign Application Priority Data

Mar. 14, 2019 (DE) .................. 10 2019 203 502.7

(51) Int. Cl.
*B60Q 3/208* (2017.01)
*F21V 23/00* (2015.01)
(Continued)

(52) U.S. Cl.
CPC ............ *B60Q 3/208* (2017.02); *F21V 23/005* (2013.01); *F21V 23/06* (2013.01); *F21Y 2115/10* (2016.08)

(58) Field of Classification Search
CPC ................. F21V 23/005; F21V 23/06
See application file for complete search history.

(56) References Cited

U.S. PATENT DOCUMENTS 5,808,718 A * 9/1998 Aikoh ............... B41J 2/451
347/130
6,074,074 A 6/2000 Marcus
(Continued)

FOREIGN PATENT DOCUMENTS

DE 202015001084 U1 3/2015
DE 102013018784 A1 5/2015
(Continued)

OTHER PUBLICATIONS

English Translation of Pietruschka DE-102015220843-A1, published Apr. 2017 (Year: 2017).*
(Continued)

*Primary Examiner* — Evan P Dzierzynski
(74) *Attorney, Agent, or Firm* — Muncy, Geissler, Olds & Lowe, P.C.

(57) ABSTRACT

A lighting unit for a motor vehicle having at least one light guide and at least one circuit board having at least one light-emitting diode. The circuit board and the light guide are attached to one another. The lighting unit is elongate and curved in the manner of a crescent with a light guide extending over the length of the lighting unit and with multiple elongated, rigid circuit boards that are each equipped with multiple light-emitting diodes, wherein the circuit boards are identically constructed and lined up in their longitudinal direction along the light guide in such a manner that the light of the light-emitting diodes can be coupled into the light guide perpendicularly to the longitudinal extent thereof, and wherein the circuit boards are connected to one another electrically and in terms of signaling by cables.

8 Claims, 3 Drawing Sheets

(51) Int. Cl.
*F21V 23/06* (2006.01)
*F21Y 115/10* (2016.01)

(56) References Cited

U.S. PATENT DOCUMENTS

| | | | |
|---|---|---|---|
| 7,416,320 B2 * | 8/2008 | Sakiyama | B60Q 1/323 |
| | | | 362/501 |
| 7,477,140 B1 * | 1/2009 | Booth | B60Q 1/302 |
| | | | 340/463 |
| 8,164,016 B2 | 4/2012 | Kim et al. | |
| 9,428,107 B2 * | 8/2016 | Hung | B60Q 1/263 |
| 9,815,399 B2 | 11/2017 | Reuschel et al. | |
| 9,846,269 B2 | 12/2017 | Sato | |
| 10,124,714 B2 | 11/2018 | Reuschel | |
| 2013/0058112 A1 * | 3/2013 | Yang | F21S 43/243 |
| | | | 362/487 |
| 2019/0244939 A1 * | 8/2019 | Liu | H01L 33/48 |

FOREIGN PATENT DOCUMENTS

| | | | | |
|---|---|---|---|---|
| DE | 102015220843 A1 * | 4/2017 | | B60Q 3/78 |
| DE | 102015220843 A1 | 4/2017 | | |
| DE | 102017103296 A1 | 8/2018 | | |
| EP | 0818652 A2 | 1/1998 | | |
| EP | 1743801 A1 | 1/2007 | | |
| EP | 1832902 A1 | 9/2007 | | |
| EP | 3018401 A1 | 5/2016 | | |

OTHER PUBLICATIONS

International Search Report dated May 13, 2020 in corresponding application PCT/EP2020/055685.

* cited by examiner

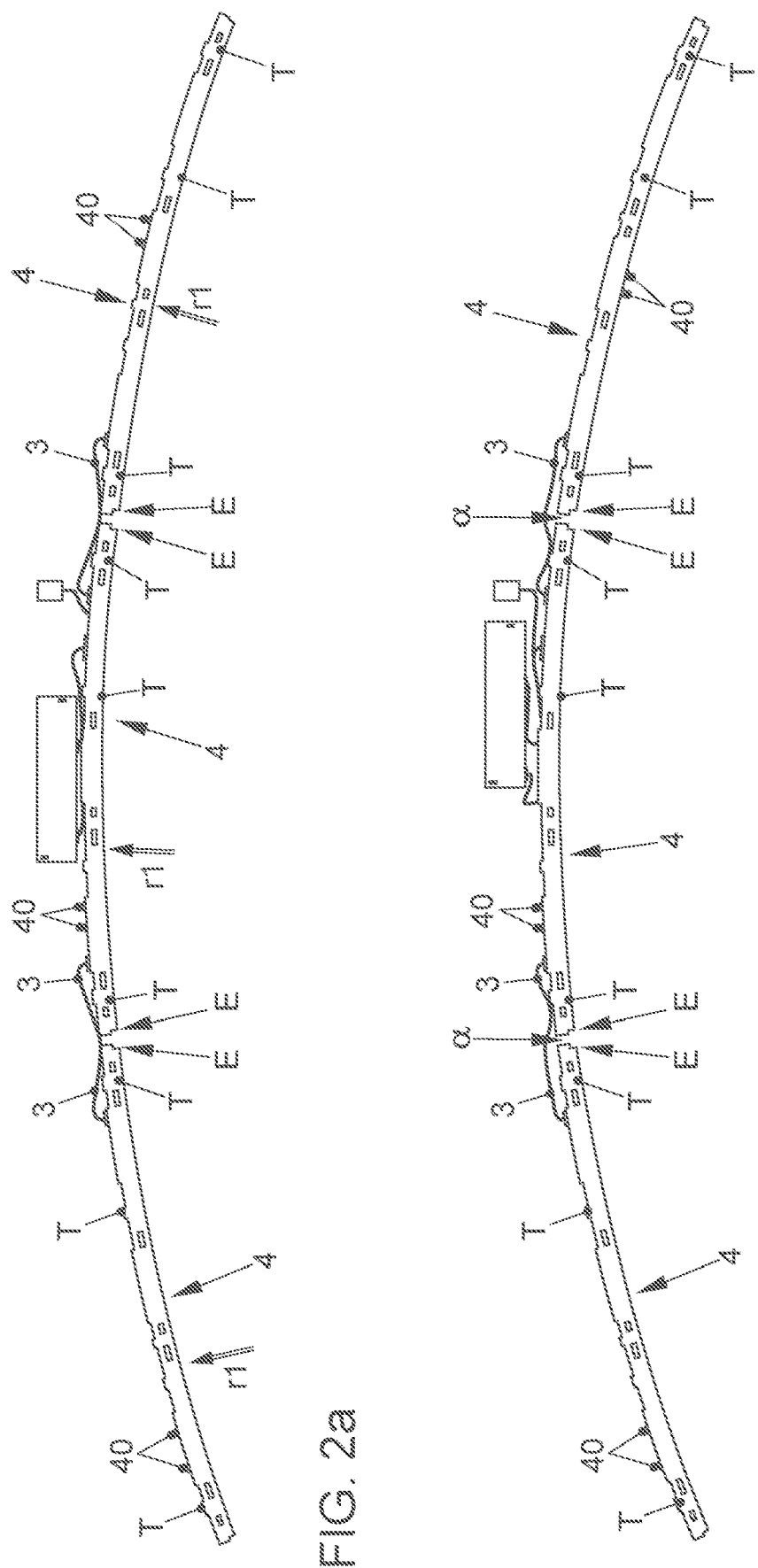

LIGHTING UNIT FOR A MOTOR VEHICLE

This nonprovisional application is a continuation of International Application No. PCT/EP2020/055685, which was filed on Mar. 4, 2020 and which claims priority to German Patent Application No. 10 2019 203 502.7, which was filed in Germany on Mar. 14, 2019, and which are both herein incorporated by reference.

BACKGROUND OF THE INVENTION

Field of the Invention

The present invention relates to a lighting unit for a motor vehicle.

Description of the Background Art

A lighting unit of this nature has become known from U.S. Pat. No. 8,164,016 B2. A start/stop switch for a motor vehicle is described therein that has a lighting unit which has a circuit board with multiple LEDs and light guides associated with the LEDs. The connection between the circuit board and the light guides is accomplished through a snap-in connection.

From DE 10 2013 018 784 A1, which corresponds to US 2016/0250963, which is incorporated herein by reference, an elongate lighting device of a vehicle has become known. In concrete terms, the motor vehicle disclosed has an elongate illumination device for creating a light strip along a predetermined segment of the illumination device. For this purpose, the lighting device has a similarly elongate light guide into which light from light-emitting diodes can be coupled. A first section of the lighting device is arranged on the interior of the vehicle and a second section on an external component of the motor vehicle, for example on a vehicle door, an engine hood, or an outside mirror.

In EP 0 818 652 A2, which corresponds to U.S. Pat. No. 6,074,074, a lighting strip is described with a multi-wire conductor strip that is equipped with light-emitting diodes arranged one after the other in a row. The conductor strip is formed of a multiplicity of conductor strip sections that are cut to length and are lined up in the axial direction. A circuit board equipped with a light-emitting diode is located between every two axially adjacent conductor strip sections and is connected to them in an electrically conductive manner. The electrical connection between the conductor strip and contacts of the circuit board is accomplished by a crimped connection and a riveted connection. Fabrication of the conductor strips connected to the circuit board is carried out in the form of a continuous strip over multiple manufacturing stations.

Finally, an illumination device for a motor vehicle window is described in U.S. Pat. No. 7,477,140 B1. The lighting device has a multiplicity of illuminated pixels, arranged in the manner of a matrix, that are formed by light-emitting diodes which are arranged along circuit boards that are arranged one below the other in the manner of rows and extend over the longitudinal direction of the display device.

SUMMARY OF THE INVENTION

It is therefore an object of the present invention to provide a lighting unit for a motor vehicle that can provide a good signaling effect in the passenger compartment of a motor vehicle in the region of a windshield for a vehicle occupant, that is matched to the shape of the windshield in the transverse vehicle direction, and that nevertheless can be produced economically.

In an exemplary embodiment, the invention is based, firstly, on a lighting unit for a motor vehicle, preferably for the passenger compartment of the motor vehicle, composed of at least one light guide and at least one circuit board having at least one light-emitting diode. The circuit board and the light guide are attached to one another.

The invention now provides that the lighting unit is designed to be elongate and curved in the manner of a crescent with a light guide extending over the length of the lighting unit. Moreover, the lighting unit has multiple elongated, rigid circuit boards that are each equipped with multiple light-emitting diodes, wherein the circuit boards are identically constructed and lined up in their longitudinal direction along the light guide in such a manner that the light of the light-emitting diodes can be coupled into the light guide perpendicularly to the longitudinal extent thereof. In this design, the circuit boards are connected to one another electrically and in terms of signaling by cables. To make electrical contact, the cables can, for example, be soldered to the circuit boards or connected by plug-and-socket connectors.

In this way a lighting unit is provided that, as an elongated lighting unit in the region of a windshield, can create a good signaling effect for a vehicle occupant and can be matched economically to different window curvatures on the basis of predetermined design requirements. It is nevertheless possible for different vehicle types to use the same electronic components.

This is because ready matching to the requisite geometries is ensured by the flexible electrical linking of the circuit boards at their ends as well as the electrical connection via plug-and-socket connectors.

A first improvement of the invention proposes that the circuit boards are connected in the region of their opposite ends by the cables, wherein the opposite ends abut one another or at most face one another at a distance so slight as to be many times smaller than a length of a circuit board.

Despite the use of multiple circuit boards, this design permits uniform spacing of the light-emitting diodes even in the transition region between the circuit boards.

Each circuit board can have a curved shape in outline with a radius of curvature. This design contributes to the ability to more easily match the circuit boards to a desired contour of the lighting unit.

Due to the use of rigid circuit boards, these boards can be positioned precisely relative to the light guide. The light guide itself, as an injection molded part, can have a geometry that compensates for different positions of the LEDs relative to a light-emitting surface, which likewise runs in the longitudinal direction of the light guide and thus of the lighting unit.

It is possible that each circuit board has multiple driver units, wherein a portion of the multiple light-emitting diodes of the circuit board is associated with each driver unit. This creates the prerequisite that handling is facilitated for assembly and for connecting the individual circuit boards to the light guide. The portions of the light-emitting diodes controlled by the driver units are preferably equal in number.

Thus, it is possible that three circuit boards are present, and 18 light-emitting diodes and three driver units are arranged on each circuit board. Each driver unit in this case controls six light-emitting diodes electrically and in terms of signaling, thus is associated with them.

It is also conceivable that each circuit board has one driver unit, wherein all light-emitting diodes of the circuit board are associated with the driver unit for control. This design permits a shorter length of the circuit boards and thus increased flexibility in orientation.

For this case, it is possible that nine circuit boards are present in the lighting unit, and six light-emitting diodes that are associated with the driver unit on the circuit board for control are arranged on each circuit board.

Another improvement proposes that the circuit boards are lined up in such a manner that the curvature of at least one circuit board is in the opposite direction to the curvature of another circuit board. This makes it possible to also realize a lighting unit with only an extremely slight bend.

The present invention is also intended to confer protection on a motor vehicle that is equipped with at least one lighting device according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 2a and 2b show a representation of a different orientation of rigid, lined-up circuit boards in keeping with different radii of the lighting units; and FIG. 3 shows a section along section line I from FIG. 1a.

DETAILED DESCRIPTION

Figure 1A:
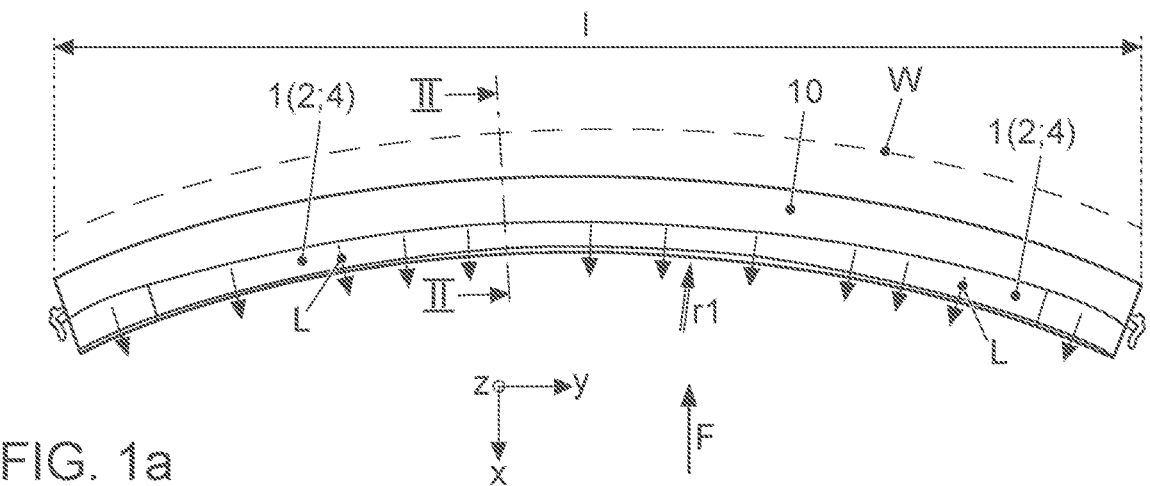
FIGS. 1a and 1b show exemplary lighting units with different radii of curvature.
Figure 1B:
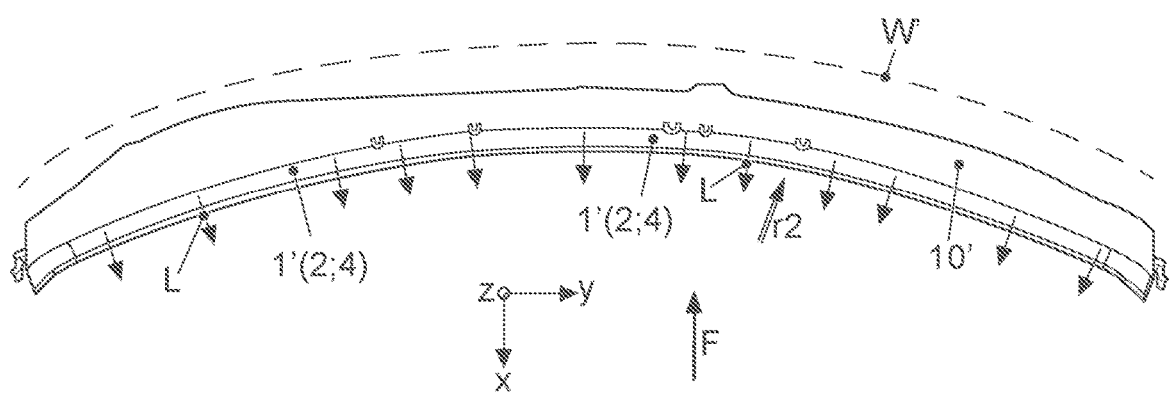

FIG. 1a shows a first exemplary embodiment for a lighting unit 1, wherein the lighting unit 1 is arranged below a cover-like component 10.

The cover-like component 10 is arranged in the region of a windshield W, of which only the shape of the visible surface is indicated.

The lighting unit 1 extends over the entire length l of the cover-like component 10. The length l can run along a substantial portion of an instrument panel (not shown) in the region of the windshield W, for example.

The lighting unit 1 has a long light guide 2 that likewise is curved in a crescent shape (see FIG. 2), to which three circuit boards 4 are attached, preferably snap-fitted.

The circuit boards 4 are each placed together in the region of their ends such that they collectively follow the radius r1 of the lighting unit 1 or the curved shape of the light guide 2.

Each of the circuit boards 4 is designed as a rigid circuit board, wherein all three circuit boards 4 have an identical radius r1.

The circuit boards 4 abut one another at their opposite ends E and thus collectively form the desired radius r1.

In the exemplary embodiment, each circuit board 4 has three driver modules T for control of light-emitting diodes 40 arranged on the circuit boards 4. In this design, one driver unit T controls exactly six light-emitting diodes 40 in each case. Consequently, a total of 54 light-emitting diodes can be controlled by the three circuit boards 4 that are lined up together and arranged in a crescent shape under a light input surface of the light guide 2.

Figure 3:
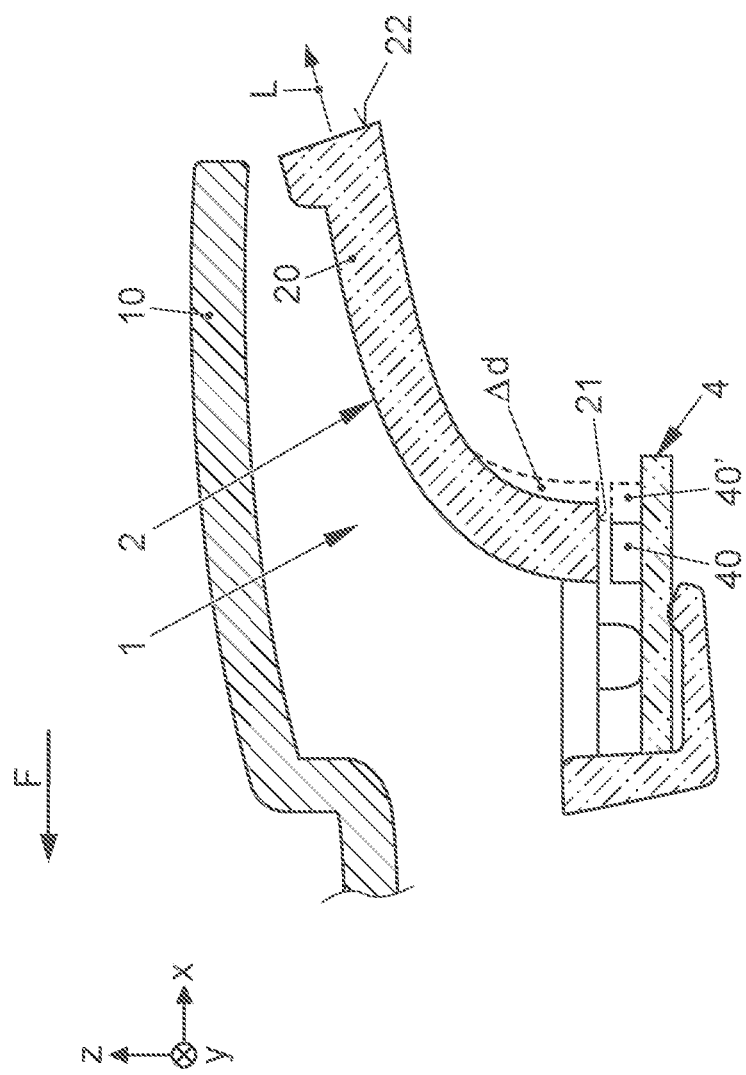

An angular offset a of light-emitting diodes 40, 40' following one another successively in the longitudinal direction l (see FIG. 2) caused by different angular positions of the circuit boards 4 relative to one another can be compensated at the given points by a suitable change in thickness Δd of a body 20 of the light guide 2 in the region of the light input surface 21. In this regard, a light-emitting diode 40 in the section plane and a subsequent light-emitting diode 40' with an angular offset a are shown in FIG. 3.

In FIG. 2b, a line-up of the three circuit boards 4 in a somewhat tighter radius of curvature r2 is shown, such as is necessary for a more sharply curved lighting unit 1' in a cover-like component 10'.

As can be seen from FIG. 2b, the opposite ends E of two lined-up circuit boards 4 stand somewhat apart in order to achieve the radius of curvature r2. However, the distance is only slight and is many times smaller than a length of each individual circuit board 4.

Departing from the exemplary embodiment, it is also possible that not just three rigid circuit boards 4, but instead even shorter, likewise rigid circuit boards are lined up with the light guide 2, to be precise preferably snap-fitted thereto (as shown in FIG. 2), and connected to one another, likewise by cables 3 (not shown in detail). Preferably it is possible in this design that nine circuit boards are joined together, and each circuit board has just one driver module T, with only six LEDs 40 associated with each of these for control.

The advantage in the case of this solution resides in an increased flexibility of the arrangement, whereas the advantage of the line-up of only three circuit boards 4 resides in easier handling.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting unit for a motor vehicle, the lighting unit comprising:
   at least one light guide; and
   circuit boards each having light-emitting diodes,
   wherein the circuit boards and the at least one light guide are attached to one another,
   wherein the lighting unit is designed to be elongate and curved in a manner of a crescent with the at least one light guide extending over a length of the lighting unit and with the circuit boards that are each rigid and elongated,
   wherein the circuit boards are each substantially identically constructed and are lined up in their longitudinal direction along the at least one light guide such that light of the light-emitting diodes is adapted to be coupled into the at least one light guide substantially perpendicularly to the longitudinal extent thereof,
   wherein the circuit boards are connected to one another electrically and in terms of signaling by cables, and
   wherein each of the circuit boards have a curved shape in outline with a radius of curvature.

2. The lighting unit according to claim 1, wherein the circuit boards are connected in a region of their opposite ends by the cables, wherein the opposite ends abut one another or at most face one another at a distance so slight as to be many times smaller than a length of a circuit board.

3. The lighting unit according to claim 1, wherein each of the circuit boards has at least two driver units, wherein a portion of the light-emitting diodes of each of the circuit boards is associated with each driver unit for control of the light-emitting diodes.

4. The lighting unit according to claim 3, wherein three circuit boards are present, wherein eighteen light-emitting diodes and three driver units are arranged on each of the three circuit boards, and wherein six light-emitting diodes are associated with each of the three driver units.

5. The lighting unit according to claim 1, wherein each circuit board has one driver unit, wherein all light-emitting diodes of the circuit board are associated with the driver unit for control.

6. The lighting unit according to claim 5, wherein nine circuit boards are present, and six light-emitting diodes that are associated with the driver unit for control are arranged on each of the nine circuit boards.

7. A motor vehicle comprising the lighting unit according to claim 1.

8. The lighting unit according to claim 1, wherein each of the circuit boards have a same radius of curvature.

* * * * *